Figure 1:
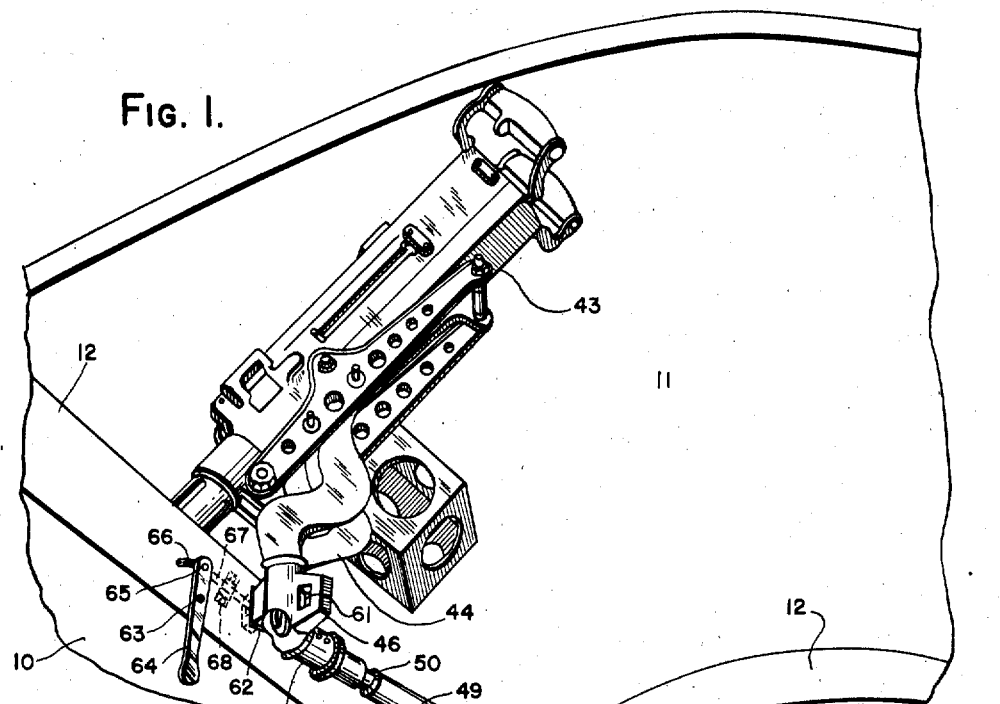

Aug. 12, 1941.   I. M. LADDON ET AL   2,252,079
RETRACTABLE GUN MOUNT
Filed Dec. 28, 1937   2 Sheets-Sheet 1

INVENTORS.
WILLIAM A. RING &
ISAAC M. LADDON.
James M. Clark
ATTORNEY.

Aug. 12, 1941.  I. M. LADDON ET AL  2,252,079
RETRACTABLE GUN MOUNT
Filed Dec. 28, 1937  2 Sheets-Sheet 2
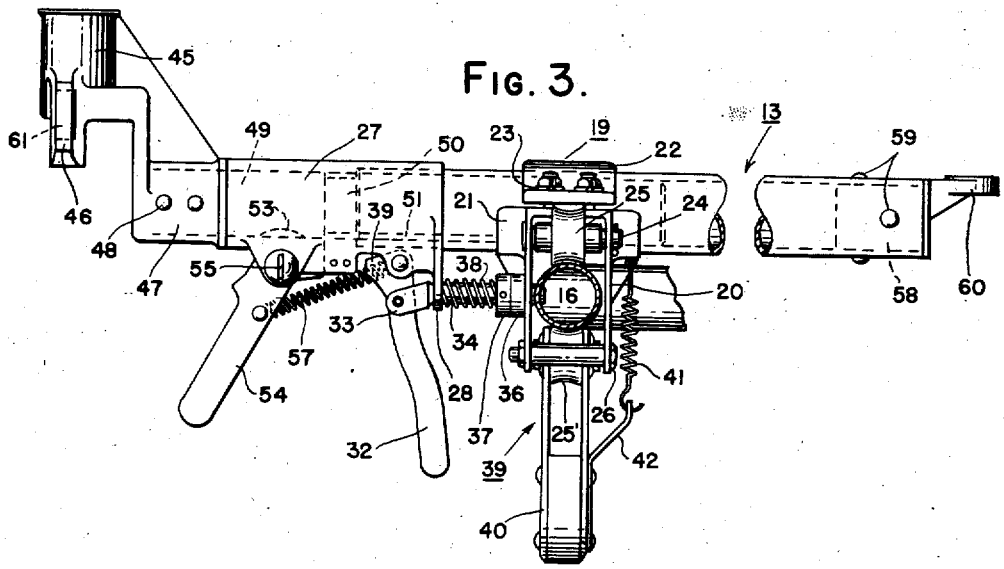
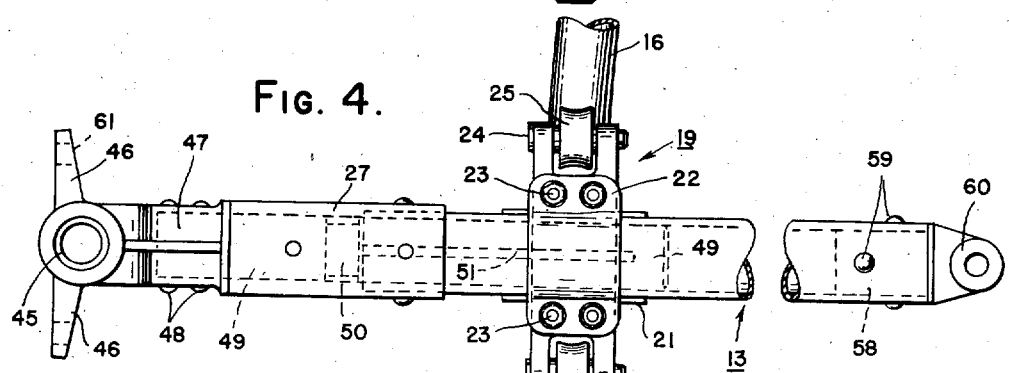
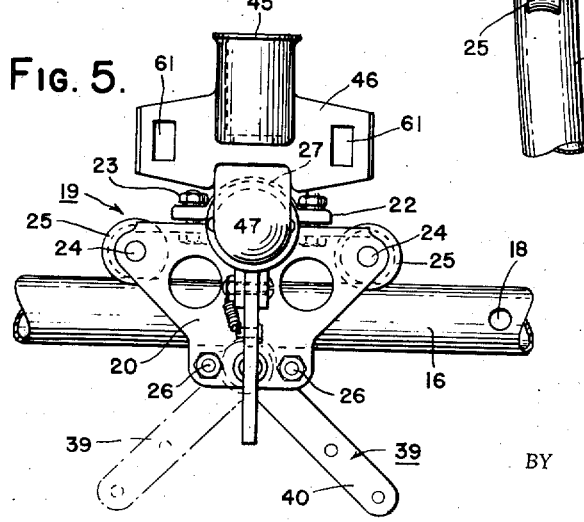
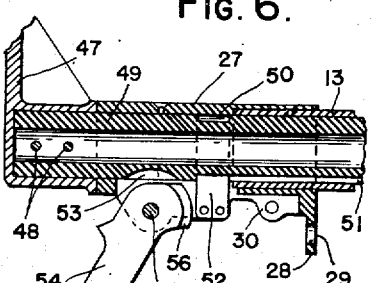
INVENTORS.
WILLIAM A. RING &
ISAAC M. LADDON.
James M. Clark
ATTORNEY Patented Aug. 12, 1941

2,252,079

UNITED STATES PATENT OFFICE 2,252,079

RETRACTABLE GUN MOUNT

Isaac M. Laddon and William A. Ring, San Diego, Calif., assignors to Consolidated Aircraft Corporation, a corporation of Delaware Application December 28, 1937, Serial No. 182,083

11 Claims. (Cl. 89—37.5)

This invention relates to gun mounts of the flexible type and is more particularly adapted for fore and aft firing, and complete retraction within aircraft bodies when not in use. The construction of this mount is such as to make it especially suitable for use in central or rear locations in aircraft having a plurality of gun installations.

Where a gun installation is made centrally or rearwardly in an aircraft it is usually contemplated that its principal mission will be defense against attack arriving from the rear quarters; hence such a gun installation is specially adapted to facilitate firing upwardly, downwardly or to either side in a more or less rearward direction. Upon occasion, however, it is desirable to utilize the fire power of the gun in a forward area and thus it is necessary that the gun mount permit of use in this alternate sphere.

Hence the main object of this invention is to produce a gun mount capable of being directed so that its associated gun can cover a principal field of fire and which at the same time can be utilized in other directions as desired so that the gun will then have a greater defense effective in all possible fields of fire.

Another object is to provide in a gun mount of this character, a gun mount mechanism which positions the gun outside of the aircraft skin for firing purposes without causing an exposure of the gunner's body any more than necessary and which also allows the gun to be fully retracted and stowed in an out of the way position when not in use.

Another object of the present invention is to provide a gun mount comprising a pivoted swinging arm equipped with a roller carriage traversible over an arcuate guide and a gun adapter situated at the free extremity of the swinging arm.

A further object in a gun mount having characteristics as described, is the inclusion of means whereby the swinging arm can be telescopically adjusted in length and among several results made possible thereby in the locking of the swinging arm to a portion of the cockpit by means of a latch system.

A still further object is a system of manual locks by which the gun may be locked in stowed position within the aircraft or in operating position externally thereto, by which the gun can be traversed and locked in any one of a number of stations on the guide rail previously mentioned; and by which any play can be taken out of the rail lock due to an auxiliary roller cam lock engageable with the guide rail.

Figure 2:
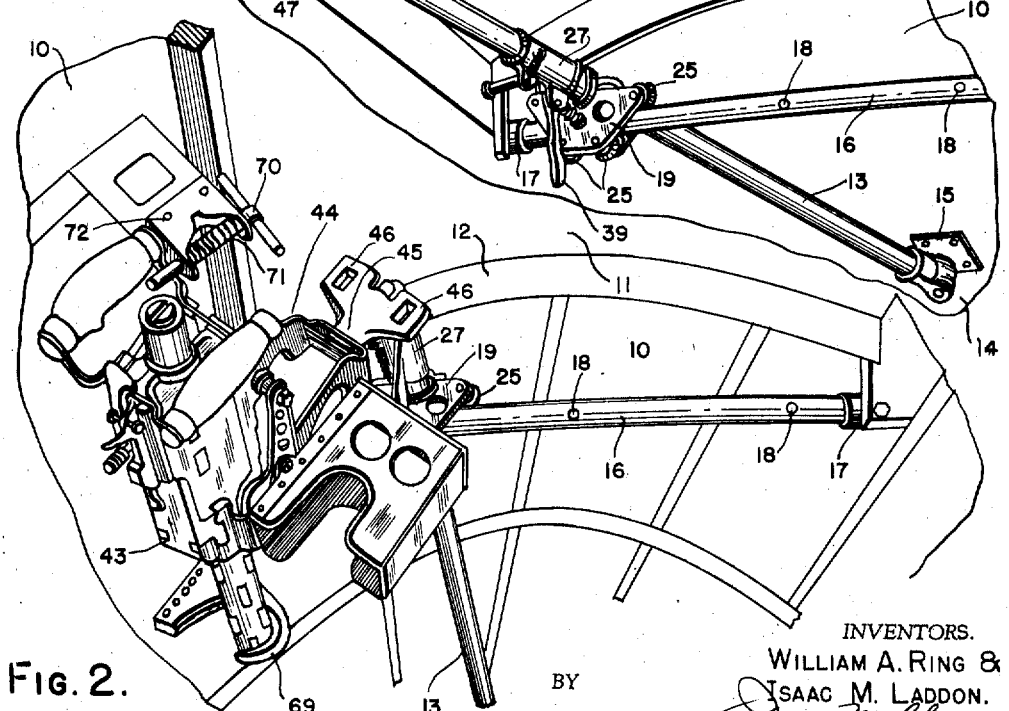

These and other objects are more fully illustrated, described and claimed in the attached drawings and following specification in which:

Fig. 1 is a general perspective view from an interior point looking upward and to the rear from the gun cockpit and showing the gun mount with the swinging arm extended and locked to the cockpit edge, Fig. 2 is similar to Fig. 1 but shows the swinging arm telescoped and the gun swung inboard to a position where it is retained in its stowage hooks, Fig. 3 is a side elevation of the swinging arm carrying the gun adapter, Fig. 4 is a plan view of Fig. 3, Fig. 5 is an end elevation of the same, and Fig. 6 is a cross section of the rear telescoping portion of the swinging arm illustrating the details of the lock by which the gun is allowed to be swung inboard.

Referring to Figs. 1 and 2, there are depicted portions of an aircraft body 10 adjacent a cockpit opening 11 which is equipped with a coaming 12, as seen from an interior vantage point. The principal member of the gun mount is a pivoted tubular strut or swinging arm 13 which is pivotally connected at 14 to a support plate 15 in turn fixedly attached to the aircraft structure. Extending across the cockpit, at or in the vicinity of the rearmost line of the coaming 12, is an arcuate tube 16 supported as by fixtures 17 and having an arc of curvature centered on the pivot point 14. This tube 16 also has a series of holes 18 spaced along its length for the purpose of locking the carriage, as will appear later. Traversible over the tube 16 is the carriage 19 which is attached to the swinging arm 13 so that the latter is substantially supported in a plane generally parallel to that of the cockpit opening 11 and yet can be easily moved from one side of the cockpit to the other as desired.

Referring now more particularly to the detail Figures 3 to 5 inclusive, it may be seen that the carriage 19 consists of an inverted, channel shaped member 20 which on its top surface carries an integral pillow block 21 designed to receive the tube 13 which is then held in place by a curved strap member 22 attached by means of bolts and nuts 23. Between the side walls of the channel member 20 are journalled, on pins 24, rollers 25 which bear upon the previously described tube 16 so that the carriage 19 can easily be moved therealong. A set of four rollers can be provided to straddle the tube 16 as shown in Fig. 1 or else an arrangement of three may be employed as in Fig. 5, but in any event the carriage side plates are held firmly spaced at their lower edges by bolts 26 so that the whole mechanism is a rigid assembly.

On the free end of the swinging arm 13 is fastened, by means of rivets, a collar or housing 27 which projects somewhat beyond the end thereof and which on its underside is adapted to support the locking levers. Looking at Figs. 3 and 6, this member 27 has an integral plate 28 depending therefrom in a transverse attitude and which is formed with a bore 29 extending in parallelism with the axis of the swinging arm 13. Adjacent thereto is a spaced pair of ears 30 between which is journalled a locking lever 32 pivotally carrying a shackle 33 attached to a cylindrical pin 34 which extends through the hole 35 and on through a boss 36 fixed to the side plate 20 so that its longitudinal axis will intercept that of the tube 16. Normally the pin 34 extends through the boss 36 into the tube 16 passing through one of the holes 18 in its surface and thus provides the means whereby the carriage is locked to the guide rail 16. To prevent accidental unlocking, a collar 37 is fixed on the pin 34 and between it and plate 28 is an encircling coil spring 38, against the compression of which any unlocking movement must be made. The collar 37 also acts as a stop in the locking direction of motion of pin 34 while an integral projection 39 on lever 32 prevents further movement when unlocking has occurred.

If an arrangement of three rollers 25 is used as is best shown in Figs. 3 and 5, with two above and one below the guide rail 16, then the lower one may be journalled in a lever 39 consisting of spaced plates and a lower hand grip portion 40 mounted by means of a slightly offset pivot between the side plates of channel member 20. Thus, due to the eccentricity of its mounting with respect to tube 16 any clockwise movement of lever 39 will move the lower roller 25' into closer engagement with the undersurface of tube 16 and if the movement is carried far enough, for instance to the dotted line position, a jamming action will occur which locks the carriage 19 to the guide tube 16. This will then supplement the locking action of pin 34 and overcome any play allowed by the latter. A spring 41 connected to the carriage 19 attaches to a metal strip 42 extending from the handle 40 and as this spring is offset from the pivotal axis of lever 39 it acts to pull the lever in a counterclockwise direction; its purpose being the prevention of the cam roller 25' from rolling itself tight when locking is not desired.

The gun 43 is mounted by means of its support bracket 44 in an adapter socket 45 which has integrally cast therewith outstanding ears 46 and a right angle socket portion 47 riveted by pins 48 to a hollow tube 49 which it surrounds for a portion of its length. The remainder of the length of tube 49 is normally telescoped into the hollow tube 13 but it can be pulled out to thus extend the length of the swinging arm 13 as will now be set forth. A feature of the tube 49 is a circular or circumferential groove 50 cut into its surface which connects at its lowermost point with a longitudinally extending groove 51 in the same surface which extends to near the end of the tube 49. Carried rigidly in the housing 27 is a fixed key 52 which extends into the circular groove 50 to prevent longitudinal movement of the tube 49 with respect to tube 13 except when the socket 45 is in the vertical position whereupon the slot 51 is aligned with key 52 and in consequence the tube 49 may be slid longitudinally; the key 52 then allowing the movement since the keyway 51 passes by it readily. Upon the end of the keyway 51 contacting the key 52 the withdrawing movement is of course stopped so that the gun 43 cannot separate from its mount.

On the other hand, when the tube 49 is pushed all the way into tube 13 it is finally stopped by the face of collar 47 contacting the end of housing 27 and in this position the key 52 is located in the groove 50 and if desired the socket 45 may be rotated with respect to swinging arm 13 as is done when the gun 43 is retracted and stowed. However, it is desirable to prevent such rotation at certain times when the tube 49 is telescoped and to this end a third slot 53 is made in the surface of tube 49 in the same plane as keyway 51 but on the opposite side of the key 52. This slot is curved as shown and below is pivoted a cam lever 54 by means of a mounting pin 55. It is formed with a complementary cam edge 56 which automatically is pulled into the slot 53 by the action of spring 57 when the parts are positioned as in Fig. 6. The result is that the handle 54 must be unlocked before the socket 45 can be rotated about the axis of tube 13. The pivot end of tube 13 is fitted with a plug 58 inserted therein and held by rivets 59, and which terminates in a suitable apertured lug such as 60 through which a pivot spindle can be passed for pivotal mounting of the swinging arm 13.

The previously mentioned ears 46 extending from the socket 45 are each pierced by a slot 61 and the purpose of these is to lock the swinging arm 13 to the cockpit coaming 12 when the gun 43 is to be used for forward firing. Returning again to Fig. 1 where the gun and mount are shown in this attitude, it is seen that the carriage 19 has been locked in one extremity of its lateral travel on tube 16, that the tube 49 has been pulled out or extended from the tube 13 and that one ear 46 extends into a complementarily shaped slot within the coaming 12. Pivoted to the latter at 63 is a lever 64 from which a link 65 extends through a curved slot 66 to connect with rod 67 which is reciprocable upon movement of handle 63, the movement taking place through guide brackets 68, and in one position thereof the rod 67 enters the hole 61 of ear 46 to lock the latter against the coaming 12. In Fig. 2, the gun 43 is shown retracted, that is to say the lever 54 has been unlocked and the gun rotated about the axis of arm 13 to bring it into the cockpit 11, following which the gun barrel was placed in a hook member 69 and its handle engaged by a pin 70, spring held at 71 in a bracket member 72.

It is to be understood that the form of my invention, herewith shown and described, is in the nature of a preferred example and that various changes in the shape, size and arrangement of parts may be resorted to without departing from the spirit of my invention or the scope of the annexed claims.

Having thus described our invention, we claim:

1. In a gun mount including a pivoted radius rod and an arcuate support, the combination of a carriage member embracing said arcuate support and adapted to adjustably position said radius rod thereon, a telescopic extension of said radius rod, a gun adapter socket member carried thereby, and auxiliary means engageable by said socket member to permit independent locking thereof in an extreme radial position of said radius rod determined by said arcuate support, said auxiliary means including a releasable latch.

2. In a gun mount including a pivoted radius rod and an arcuate support, the combination of a roller carriage embracing said arcuate support adapted to adjustably position said radius rod thereon, a telescopic extension of said radius rod, means for releasably locking said extension against rotation about its longitudinal axis, a gun adapter socket carried by an extremity of said extension, oppositely projecting eared portions of the socket having openings traversing the thickness thereof adapted for locking said telescopic extension in either of its extreme radial positions and fixedly mounted latch means adapted to cooperate with said ear portions.

3. In an aircraft gun mount including a horizontally disposed, hollow radius member fixed to a carriage movable over an arcuate support, the combination of a telescopic extension of said radius member characterized by a longitudinal slot extending over substantially the length of said extension and by a circumferential groove encircling said extension at one end of said slot, a fixed member adapted to alternately project into said slot or said groove to control rotation of said extension with respect to said radius member, pivoted means engageable to prevent movement of said extension when fully telescoped, a gun adapter extending from the free end of said extension and other means adapted to cooperate with a latch fixed to the aircraft to lock said extension against movement when fully extended, the last said means being integrally a part of said gun adapter.

4. In an aircraft gun mount characterized by a pivoted radius rod, an arcuate support, a carriage member embracing said arcuate support adapted to adjustably position said radius rod thereon, the combination of a telescopic extension of said radius rod, a gun adapter socket member carried thereby and means to lock said extension to a fixed part of said aircraft comprising a pair of apertured lugs extending at right angles from said extension on opposite sides thereof and adapted to fit into matching holes in said aircraft, a slidable bolt adapted to enter one of said apertures to prevent withdrawal of the lug from its respective hole and means to actuate said bolt.

5. In an aircraft gun mount, a gunner's cockpit, a horizontally disposed radius rod pivotally mounted for horizontal swinging within the aircraft in a fixed plane below the level of the cockpit opening, said pivotal mounting being remotely positioned from the cockpit opening, a guide disposed below the cockpit periphery to extend between spaced points within said cockpit, a carriage slidable over said guide and supporting said radius rod, a telescopic extension of said radius rod adapted to rotate relative to said rod about its own longitudinal axis, a gun mounted on the free end of said extension, the said gun mount being so organized that all of its externally disposed parts may be retracted into said aircraft by rotation of said extension about its longitudinal axis and lock means to control such rotation.

6. In a gun mount, guide means adapted to permit traversing a gun throughout a limited sector, a telescoping gun support comprising a relatively fixed part, an extensible gun bearing part, a keyway system in one of said parts, a cooperating key fixed to the other of said parts, the said key and keyway being organized to allow rotation of said extensible part about its longitudinal axis only when fully telescoped for gun retracting purposes, releasable lock means for preventing such retraction, said extensible part being adapted for axial sliding whereby the gun can be extended to remote positions allowing traversing thereof through different sectors of fire and means for locking said extensible part in such remote locations comprising an independently mounted lock engaging said gun bearing part.

7. In an aircraft, a gun mount, a pivoted radius rod, an arcuate support adapted to adjustably position said radius rod thereon whereby said gun mount is adapted to permit traversing a gun throughout its principal field of fire, an extensible gun supporting member telescopically associated with said radius rod, a keyway system in said extensible member, a fixed key projecting into said keyway, the said key and keyway permitting axial rotation of said extensible member only when fully telescoped and otherwise providing for axial extension thereof whereby said gun can be extended to remote locations for pivotation through secondary fields of fire and lock means adapted to releasably attach said extensible member to a fixed part of said aircraft to prevent movement of said carriage member over said arcuate support.

8. In an aircraft, a gunner's cockpit, a gun mount including a radius rod adapted to swing in a substantially horizontal plane, a pivotal mounting for said radius rod disposed within said aircraft at a point spaced from the cockpit opening, a guide rail extending between opposite sides of said gunner's cockpit in spaced relation thereto, a carriage traversible on said guide serving to support said radius rod, an axially slidable extension associated with said radius rod, a gun adapter carried thereby, means to lock said carriage to said guide rail and means to lock said gun adapter to a fixed portion of said gunner's cockpit.

9. In an aircraft, a gunner's cockpit embodied in said aircraft, a gun mount comprising a pivoted radius rod, a guide rail subtending a portion of said cockpit, means connecting said radius rod for swinging movements along said guide rail wereby said gun mount is adapted to traverse a gun throughout its principal field of fire, an extensible gun supporting member telescopically associated with said radius rod, and lock means adapted to releasably attach said extensible member to a fixed part of said aircraft remote from said guide rail to permit gun operation in secondary fields of fire.

10. In an aircraft, a body surface, a gunner's cockpit opening therein, a radius rod pivoted on the underside of said surface at a point displaced from said cockpit opening, a guide rail subtending a portion of said opening adjacent to said pivot, a carriage supporting said radius rod for movement along said guide rail, a rotatable and axially slidable extension telescopically associated with said radius rod, lock means organized to provide for normal operation of said gun at selected points along said guide rail, to release said extension for axial rotation whereby said gun may be swung to a stowing position and to provide fixation of said extension in a projected position.

11. In a gun mount including a pivoted radius rod and a guide rail, the combination of a carriage member embracing said guide rail and adapted to adjustably position said radius rod thereon, a telescopic extension of said radius rod, a gun adapter socket member carried thereby, and auxiliary means cooperable with said socket member to provide independent locking thereof in projected positions of said extension, said auxiliary means including a releasable lock.

ISAAC M. LADDON.
WILLIAM A. RING.